United States Patent [19]

Keller et al.

[11] Patent Number: 4,618,215
[45] Date of Patent: Oct. 21, 1986

[54] DOUBLE WINDOW VIEWING CHAMBER ASSEMBLY

[75] Inventors: Vernon W. Keller; Robert B. Owen; Bobby R. Elkins; William T. White, all of Huntsville, Ala.

[73] Assignee: The United States of America as represented by the Administrator of the National Aeronautics and Space Administration, Washington, D.C.

[21] Appl. No.: 729,766

[22] Filed: May 2, 1985

[51] Int. Cl.$^4$ ............................................. G02B 7/00
[52] U.S. Cl. .................................................. 350/319
[58] Field of Search ............... 350/319, 418, 419, 286, 350/543, 430; 356/244, 246, 352

[56] References Cited

U.S. PATENT DOCUMENTS

| | | | |
|---|---|---|---|
| 3,438,700 | 4/1969 | Gillard | 350/286 |
| 3,782,809 | 1/1974 | Shropshire | 350/319 |
| 3,894,795 | 7/1975 | Laurens | 350/319 |
| 4,255,020 | 3/1981 | Yukio | 350/430 |
| 4,436,375 | 3/1984 | Meginnis | 350/319 |

Primary Examiner—John K. Corbin
Assistant Examiner—Loha Ben
Attorney, Agent, or Firm—Joseph H. Beumer; John R. Manning; Leon D. Wofford, Jr.

[57] ABSTRACT

A viewing chamber which permits observation of a sample retained therein includes a pair of double window assemblies mounted in opposed openings in the walls thereof so that a light beam can directly enter and exit from the chamber. A flexible mounting arrangement for the outer windows of the window assemblies enables the windows to be brought into proper alignment. An electrical heating arrangement prevents fogging of the outer windows whereas desiccated air in the volume between the outer and inner windows prevents fogging of the latter.

17 Claims, 2 Drawing Figures

DOUBLE WINDOW VIEWING CHAMBER ASSEMBLY

ORIGIN OF THE INVENTION

The invention described herein was made by an employee of the United States Government, and may be manufactured and used by or for the Government for governmental purposes without the payment of any royalties thereon or therefor.

FIELD OF THE INVENTION

The present invention relates to viewing chambers which permit optical viewing of a sample contained therein and more particularly, to an improved viewing chamber assembly employing a pair of double window ports located on opposite sides of the chamber.

BACKGROUND OF THE INVENTION

The present invention is concerned with, but is not limited to, viewing chambers which require isothermal cooling to temperatures below freezing. Such chambers are employed, among other uses, in observation of crystal growth in connection with aircraft flight experiments. Prior art chambers characteristically use a single wall construction for the access ports thereof which has caused thermal non-conformity in the walls, thereby resulting in uneven cooling of the chamber. Such prior art chambers have also been subject to fogging of the viewing window as the chamber cools.

Patents of possible interest in this general area include:

U.S. Pat. Nos. 4,242,589 (Sachs); 3,936,196 (Wickersheim); 3,966,297 (Vigreux et al); 3,899,243 (Haverkamp); and 4,372,652 (Pontefract).

SUMMARY OF THE INVENTION

As set forth above, one important aspect of the invention concerns the provision of chamber including a pair of double window viewing ports. One of the reasons that chambers with double windows have not been used in the past is that a slight misalignment of the windows results in multiple reflections and distorts the image. Further, if fogging is not eliminated, the use of multiple window surfaces accentuates the image degradation which results from such fogging. Generally speaking, as set forth above, one important aspect of the invention involves the provision of two double-window ports on opposite sides of the chamber, for a total of four windows, together with flexible, adjustable mounts for the windows which permit the windows to be adjusted about two axes parallel to the window surfaces. These flexible mounts permit the outer windows of the sets of two windows to be aligned with the inner windows, thereby eliminating multiple reflection distortions of the chamber sample image. By locating the optical ports on opposing sides of the chamber, a light path is provided which permits a beam of light to enter and exit directly, thereby providing optimum optical access to the chamber.

Thus, in accordance with a preferred embodiment of the invention, an optical viewing arrangement is provided in a viewing chamber apparatus having chamber walls in which a coolant is circulated to provide cooling of the chamber, the optical viewing arrangement comprising first and second window assemblies respectively mounted in first and second opposed openings on opposite sides of the chamber wall such that the window assemblies are in optical alignment whereby a light beam can enter and exit from the chamber directly. The window assemblies each comprise inner and outer windows mounted in spaced relationship so as to define a volume therebetween, and a flexible mounting arrangement for the outer one of the windows so as to permit adjustment in the positioning of that window, whereby the inner and outer windows can be brought into proper optical alignment. The flexible mounting means preferably includes a window holder for the outer window and a plurality of screws for securing the window holder to a mounting member for the inner window. Advantageously, the flexible mounting means further comprises a flexible connection between the window holder and the mounting member. The screws preferably extend through corresponding enlarged diameter bores in the window holder and in this embodiment, the flexible mounting means each further comprise a bearing, located within the associated bore at the outer end thereof, in which the head of the corresponding screw is received, and a coil spring located between each window holder and the corresponding mounting member, and surrounding the associated screw.

The inner window of each window assembly is preferably located in an associated one of the openings in the chamber wall, the window assemblies each including a retaining arrangement received in the corresponding opening for holding the inner window in place. The openings referred to are preferably threaded and the portions of the walls defining the openings include a stepped portion against which one surface of the inner window is held. The retaining arrangements each preferably include a screw threaded retaining member threadably received in the associated opening and a locking ring for locking the retainer member into place. Advantageously, the retaining arrangement further comprises an O-ring located in the stepped portion of the wall for cushioning and sealing the one surface of inner window, and a spacer located between said retainer member and the other surface of the inner window. A desiccated gas is preferably located in the volume defined between the pairs of windows.

As explained in more detail below, a heating means is provided for heating the outer windows to prevent fogging thereof. This heating means preferably comprises an electrical heating coil mounted on the mounting fixture for the outer window. Further, an additional heating means is mounted within the chamber wall for providing fine adjustment of the chamber temperature. The latter preferably comprises an electrical heating arrangement and is used in conjunction with the cooling fluid which is circulated in the walls of the chamber to control the temperature in the chamber.

Advantageously, the plurality of connecting screws extending between the window holder and the remainder of the window assembly, together with the flexible connector, constitute the sole connection between the window holder and the remainder of said window assembly. Low thermal conductivity screws reduce the heat transfer between the outer window assembly and the chamber.

Other features and advantages of the present invention will be set forth in, or apparent from, the detailed description of a preferred embodiment which follows.

DESCRIPTION OF THE PREFERRED EMBODIMENTS

Figure 1:
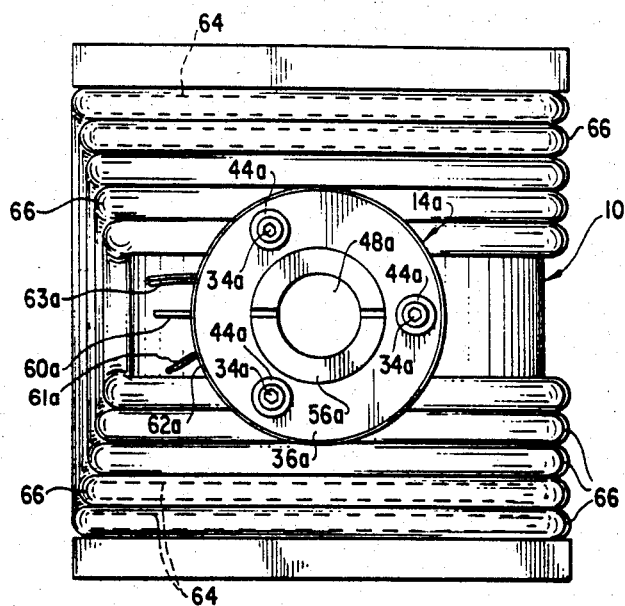
FIG. 1 is a side elevational view of a viewing chamber apparatus constructed in accordance with a preferred embodiment of the invention.
Figure 2:
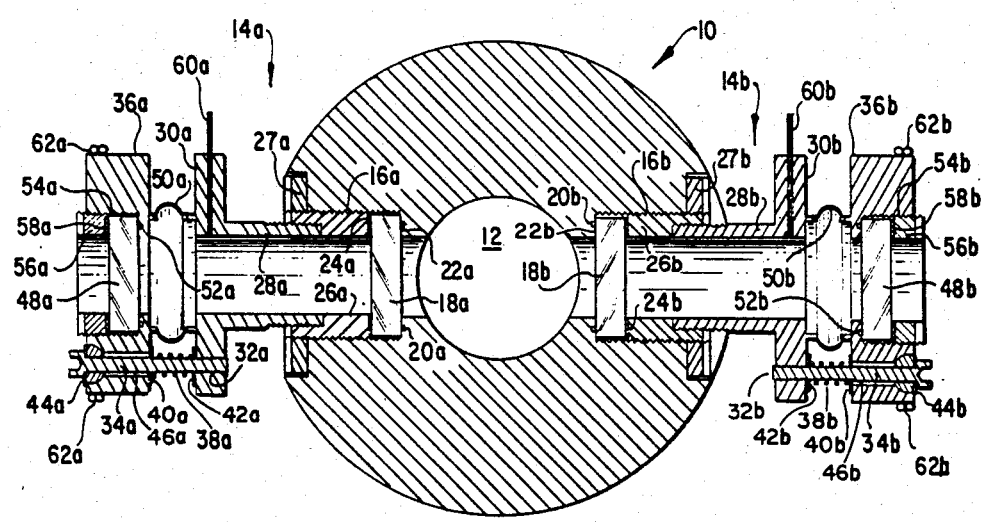
FIG. 2 is a cross section view of the chamber apparatus of the FIG. 1, with the heating and cooling coils for the chamber walls removed.

Referring to FIGS. 1 and 2, the chamber assembly of the invention includes a generally cylindrical, thick-walled housing 10 forming a central chamber 12. A pair of dual optical window assemblies, denoted 14a and 14b, are respectively mounted in stepped openings 16a and 16b formed in opposite walls of the housing. The two dual optical window assemblies are substantially identical and corresponding parts of each have been given the same numbers with the letter a or letter b attached. Because of this similarity, only one of the window assemblies will be described below.

Considering window assembly 14a, one flat surface of a generally cylindrical inner window 18a is held against an O-ring seal mounted in a groove in a shoulder 22a defining one step in stepped opening 16a. A spacer 24a is located between the other flat surface and a threaded cylindrical retainer member 26a which is screwed into opening 16a so as to hold window 18a in place. A locking ring 27a located in enlarged portion of opening 16a serves in locking retainer member 26a in place in opening 16a.

A plug member 28a is threaded at one end and this threaded end is received in retainer member 26a, as illustrated. A laterally extending flange 30a includes three threaded bores 32a (only one of which is shown in FIG. 2), in which are received three screws 34a. Screws 34a each form part of an adjustment screw assembly and extend between flange 30a and a window holder member 36a. Considering a typical one of the adjustment screw assemblies, as shown in FIG. 2, a spring 38a surrounds a portion of screw 34a and is captured between flange 30a and window holder 36a, between washers 40a and 42a. The outermost portion of screw 34a is mounted by a bearing 44a in an enlarged bore 46a in window holder 36a.

Window holder 36a serves to mount an outer window 48a and is further connected to plug member 28a by a flexible connector tube 50a mounted on facing opposed flanges on window holder 36a and plug member 28a. One flat surface of window 48a bears against an O-ring 52a disposed in a groove in an end wall defining a bore 54a in window holder 36a and is held in place within bore 54a by a threaded retaining ring 56a and an intermediate washer 58a.

A pair of stainless steel tubes 60a and 61a (see FIG. 1) are brazed or soldered in place in flange 30a of plug 28a. These tubes form an inlet and outlet for an inert gas, such as desiccated air, which is supplied to the volume between windows 48a and 18a.

A heating coil, located around the mounting fixture for window 48a and indicated schematically at 62a in FIGS. 1 and 2, provides selective heating of window 48a so as to eliminate fogging thereof. Electrical connections to coil 62a are indicated at 63a.

As stated above, the other double window assembly 14b is similar to assembly 14a and includes the same basic components, which are identified by the same reference numerals with the letter "b" attached.

Turning again to the chamber proper, the walls 10 are preferably formed from a thick aluminum block the exterior of which is insulated as required and which contains both heating coils, indicated schematically at 64 in FIG. 1, and cooling coils, indicated schematically at 66 in FIG. 1. The heating and cooling coils are not shown in FIG. 2 for purposes of clarity. The heating coils 64 are electrical coils and are preferably disposed in grooves in walls 10 while the cooling coils 66 have a frigid liquid coolant circulating therein. The coolant can be a liquid with a low temperature freezing point, such as ethylene glycol, or, if either rapid cooling or a very low temperature is required, the coolant can even be liquid nitrogen. The liquid coolant provides coarse temperature control of the temperature of chamber 12 while electrical heating coils 64 provide fine adjustment of this temperature. This arrangement permits an extremely uniform temperature to be set up within the chamber 12, while still permitting optimum optical access for measurement and observational purposes. In this way, a sample in chamber 12 can be cooled in a highly controlled manner to any higher temperature reasonably close to the freezing point of the coolant by cooling the liquid coolant to an appropriate value, circulating the coolant through the walls 10 in cooling coils 66 as described above until the temperature within chamber 12 is slightly below the desired temperature, and then using the electrical heating coils 64 to provide fine adjustment of the chamber temperature.

The flexible mounting described above for outermost windows 48a and 48b enables these windows to be tilted around two axes parallel to the surfaces thereof so as to correct for misalignment. In particular, relative adjustment of screws 34a and 34b enables the tilt of windows 48a and 48b to be controlled so that these windows can be brought into proper alignment with the fixed, inner windows 18a and 18b, while the flexible connection provided by flexible connecting tubes 50a and 50b permits this to be done. By bringing the inner and outer windows into optical alignment, multiple reflection distortions of the image of the chamber sample are eliminated. Further, by providing dual window assemblies on both sides, a light path is provided which allows a beam to enter and exit directly, thus affording optimum optical access to the chamber 12. In addition, the construction of the window mounting assemblies minimizes the thermal conduction between the mounting fixtures for the outer windows 48a and 48b and the chamber walls 10, thereby reducing the amount of heating required and lessening the impact of the mounting fixtures on the thermal uniformity provided in chamber 12. As mentioned above, desiccated air placed in the volumes formed between windows 48a, 18a and 48b, 18b respectively, ensures that fogging of inner windows 18a and 18b does not occur. This air is supplied to assembly 14a, for example, through inlet and outlet tubes 60a and 61a.

It will be understood by those skilled in the art that although the invention has been described relative to an exemplary embodiment thereof, variations and modifications can be effected in this exemplary embodiment without departing from the scope and spirit of the invention.

We claim:

1. In a viewing chamber apparatus having a chamber wall in which a coolant is circulated to provide cooling of the chamber, an optical viewing arrangement comprising first and second window assemblies respectively mounted in first and second opposed openings in the chamber wall such that said window assemblies are in optical alignment whereby a light beam can enter and exit from the chamber directly, said window assemblies each comprising inner and outer windows mounted in spaced relationship so as to define a volume therebetween, and flexible mounting means for the outer one of the windows for permitting adjustment of the positioning of said outer window whereby the inner and outer windows can be brought into optical alignment.

2. A viewing chamber apparatus as claimed in claim 1 wherein said flexible mounting means includes a window holder member and a plurality of screws for securing said window holder member to a mounting member for said inner window.

3. A viewing chamber apparatus as claimed in claim 2 wherein said flexible mounting means further comprises a flexible connection between said window holder member and said mounting member.

4. A viewing chamber apparatus as claimed in claim 3 wherein said screws extend through corresponding bores in said window holder member and said flexible mounting means further comprises a bearing, located within each of said bores at the outer end thereof, in which the head of the corresponding screw is received, and a spring located between each window holder member and the corresponding mounting member.

5. A viewing chamber apparatus as claimed in claim 1 wherein the inner window of each member assembly is located in a corresponding one of said openings in the chamber wall, said window assemblies each including retaining means received in the corresponding said opening for holding said inner window in place.

6. A viewing chamber apparatus as claimed in claim 5 wherein each of said openings is threaded and the portions of the wall defining the openings include a stepped portion against which one surface of said inner window is held, and said retaining means each comprises a screw threaded retaining member threadably received in the corresponding one of said openings and a locking ring for locking said retainer member into place.

7. A viewing chamber apparatus as claimed in claim 6 wherein said retaining means further comprises an O-ring located in said stepped portion for cushioning said one surface of inner window and a spacer located between said retainer member and the other surface of said inner window.

8. A viewing chamber apparatus as claimed in claim 1 wherein a desiccated gas is located in said volume defined between said windows.

9. A viewing chamber apparatus as claimed in claim 1 further comprising heating means for heating the outer windows to prevent fogging thereof.

10. A viewing chamber apparatus as claimed in claim 9 wherein said heating means comprises an electrical heating coil mounted on the flexible mounting means for said outer window.

11. A viewing chamber apparatus as claimed in claim 1 further comprising heating means mounted within said chamber wall for providing fine adjustment of the chamber temperature.

12. A viewing chamber apparatus as claimed in claim 11 wherein said heating means comprises electrical heating means.

13. A viewing chamber apparatus as claimed in claim 1 wherein each said flexible mounting means includes a window holder for the outer window, and adjustable mounting means for providing adjustment of the position of said window holder relative to the remainder of the window assembly.

14. A viewing chamber apparatus as claimed in claim 13 wherein said adjustable mounting means includes a flexible connector located between said window holder and the remainder of said window assembly which serves in defining said volume between said inner and outer windows.

15. A viewing chamber apparatus as claimed in claim 14 wherein said adjustable mounting means includes a plurality of connecting screws extending between said window holder and the remainder of the window assembly which, together with said flexible connector, constitute the sole connection between said window holder and the remainder of said window assembly.

16. A viewing chamber apparatus as claimed in claim 15 further comprising bearing means for mounting one end of each of said screws in an enlarged bore in said window holder.

17. A viewing chamber apparatus as claimed in claim 15 further comprising a coil spring surrounding each of said screws and extending between said window holder and the remainder of said window assembly.

* * * * *